INVENTORS
RAYMOND W. JENSEN
EDWARD J. KNIGHT JR.
BY ELMER D. MARLIN

Herschel C. Omohundro
ATTORNEY

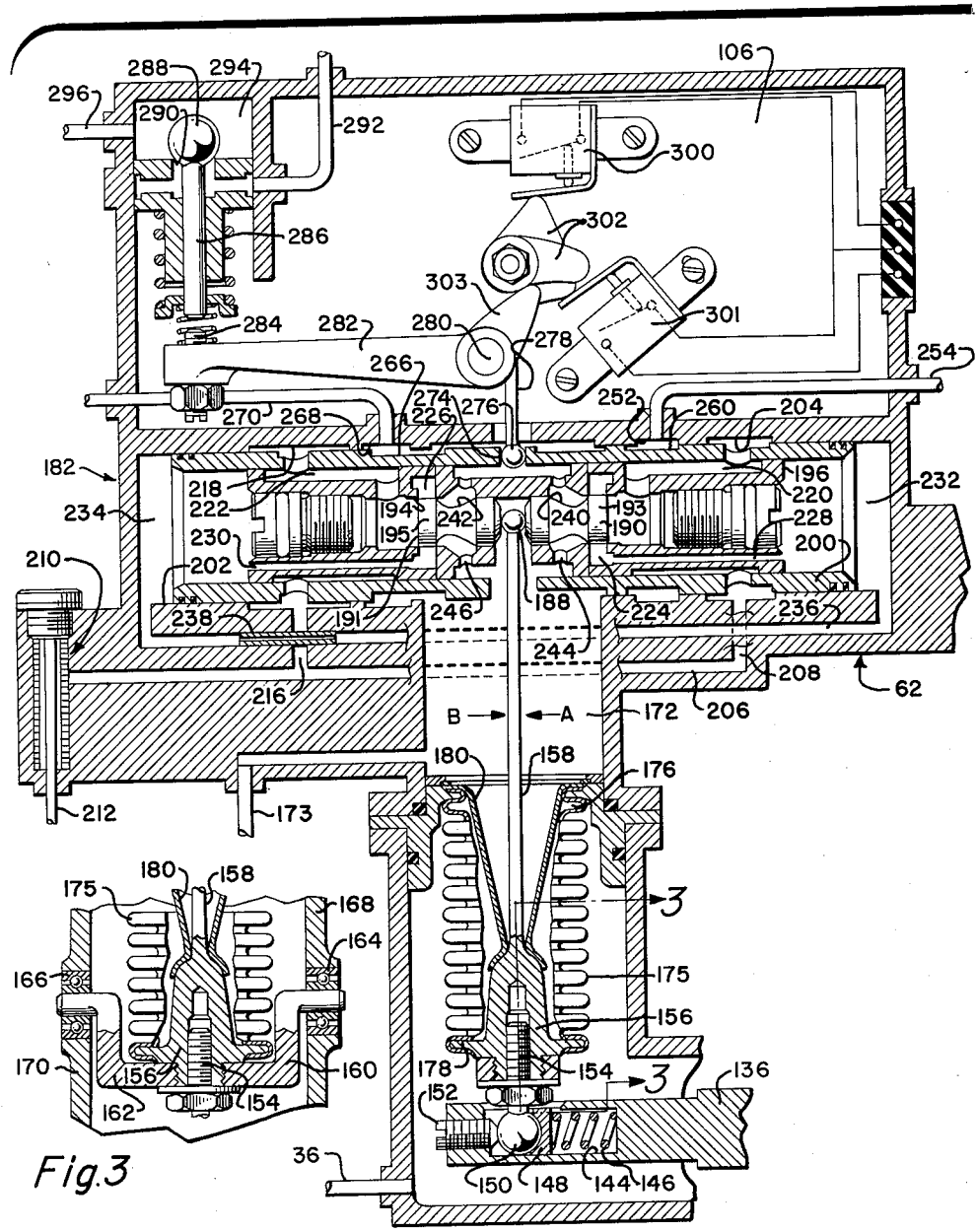

United States Patent Office 3,063,239
Patented Nov. 13, 1962

3,063,239
TEMPERATURE COMPENSATED PRESSURE RATIO SENSING CONTROLLER FOR AN AFTERBURNER FUEL CONTROL
Raymond W. Jensen, Edward J. Knight, Jr., and Elmer D. Marlin, Phoenix, Ariz., assignors to The Garrett Corporation, Los Angeles, Calif., a corporation of California
Filed May 2, 1958, Ser. No. 732,525
4 Claims. (Cl. 60—35.6)

This invention relates to a temperature compensated pressure ratio sensing device, and is more particularly directed to a device adapted for use in controlling jet engine afterburner fuel systems.

It is generally known that afterburners located to burn fuel downstream of a jet engine turbine may greatly increase the thrust of such an engine, and may be useful for interim operation when fuel economy is not a primary consideration. The interim operation of an afterburner must be limited to conditions under which the weight flow of fluid and velocity thereof do not exceed predetermined values and cause the flame at the afterburner to blow out. Further, it is desired to operate an afterburner under conditions whereby the weight flow of fluid and its velocity through the turbine may be adequate to support most efficient usage of the afterburner fuel to obtain maximum performance of the afterburner.

The conditions under which the afterburner fuel may be used downstream of the turbine of a jet engine also depend upon ambient temperature at the inlet of the jet engine compressor, which temperature affects fluid pressure at the inlet of the jet engine turbine, and consequently, the compression ratio thereacross. Furthermore, changes in speed of the turbine tend to change the pressure ratio across the turbine.

As ambient temperatures decrease, air densities at the inlet of the jet engine compressor increase correspondingly, whereupon the compressor, operating at a given r.p.m., is capable of attaining a higher output pressure and weight flow of air which is delivered to the engine turbine.

Accordingly, it is necessary to limit the operation of an afterburner within a predetermined range of pressure ratios, as for example, pressure ratios of 4:1 plus or minus 10 percent. In order to account for changes in fluid weight flow through the turbine as related to compression ratio, it is necessary to sense the temperature of air at the inlet of a jet engine compressor, together with pressures upstream and downstream of the engine turbine. Thus, a control signal relating to pressure ratio across the turbine may be modified by the temperature of the air entering the inlet of the compressor.

From the foregoing, it will be appreciated that either a change in air density or speed of the turbine will cause a variation in the pressure ratio thereacross. An increase in pressure ratio will increase the velocity of air through the turbine, and consequently, velocity downstream of the turbine at the afterburner fuel nozzle. Therefore, any set of conditions which causes excessive fluid flow velocity and weight flow of such fluid will cause the flame at the afterburner to blow out. This condition may occur, for example, as set forth above, at a ratio of 4:1 plus a factor equalling 10 percent of said ratio, which factor may be accounted for by either an increase in turbine speed and/or an increase in fluid weight flow through the turbine. When, according to the present example, the compression ratio across the turbine, as affected by inlet temperature to the compressor and speed of the turbine, equals a 4:1 ratio minus a factor of 10 percent, it is desirable to prevent operation of the afterburner due to the fact that such conditions are unfavorable with respect to good performance thereof.

Accordingly, it is an object of the invention to provide a novel temperature compensated pressure ratio sensing device which prevents operation of an afterburner downstream of a jet engine turbine when combined functions of the turbine speed and engine compressor inlet temperature exceed a predetermined value, or become less than another predetermined value.

Another object of the present invention is to provide a novel temperature compensated pressure ratio sensing device which is particularly adapted for use in controlling jet engine afterburner fuel systems.

Another object of the invention is to provide a temperature compensated pressure ratio sensing device having novel means for sensing a pressure differential and compensating it in accordance with temperature changes.

Another object of the invention is to provide a pneumatically operable temperature compensated pressure ratio sensing device which is capable of sampling high temperature fluids normally encountered upstream and downstream of a hot gas turbine.

Another object of the invention is to provide a novel temperature compensated pressure ratio sensing device wherein variations in temperature cause modulation of a fluid pressure.

Another object of the invention is to provide a pneumatically operable temperature compensated pressure ratio sensing device wherein a pneumatic actuator operates a hydraulic servomechanism by means of a pivoted lever having novel pivotal bearings which straddle a hermetic seal mechanism disposed between zones receiving the pneumatic and hydraulic fluids utilized by said device.

Further objects and advantages of the present invention may be apparent from the following specification, appended claims, and accompanying drawings, in which:

FIG. 3 is a fragmentary vertical sectional view taken on the plane indicated by the line 3—3 of FIG. 2.

Figure 1:
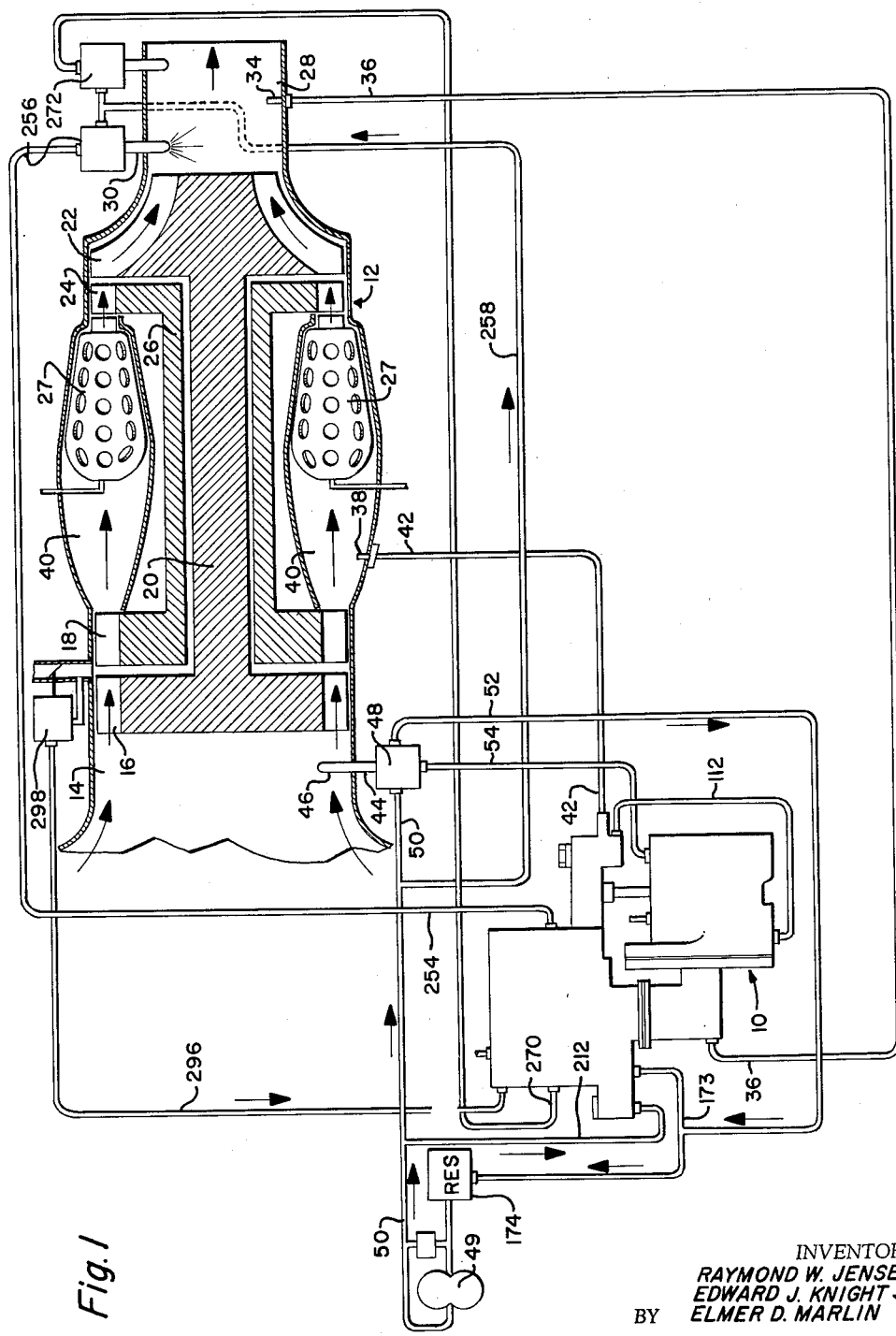
FIGURE 1 is a diagrammatic view showing a system containing a temperature compensated pressure ratio sensing device formed according to the present invention and connected to a jet engine and its afterburner control accessories.

As shown in FIG. 1, a temperature compensated pressure ratio sensing device and servomechanism 10 is connected by suitable conduits with control accessories of a jet engine 12, which comprises a compressor air inlet plenum 14 communicating with first and second stages 16 and 18, respectively, of the jet engine compressor. The first stage 16 of the compressor is coupled to a second stage 22 of a hot gas turbine by means of a shaft 20. The second stage 18 of the compressor is coupled to a first stage 24 of the hot gas turbine by means of a hollow shaft 26. The first stage 24 of the turbine has an axial configuration, while the second stage 22 has centripetal configuration. Disposed between the second stage 18 of the compressor and the first stage 24 of the hot gas turbine are conventional fuel combustion chambers 27, which are disposed to deliver hot gas at a constant maximum allowable temperature to the inlet of the first stage 24 of the engine turbine.

Communicating with the outlet of the second stage 22 is an afterburner 28 having a fuel dispensing nozzle 30 therein. Disposed at the outlet of the turbine 22, and upstream of the afterburner 28, is a fluid pressure sensing probe 34, which communicates with a conduit 36. This conduit 36 delivers turbine outlet fluid pressure to the sensing device 10.

Another fluid pressure sampling probe 38 is disposed in a compressor output plenum 40 and serves to sample fluid supplied under pressure to the combustion chambers 27 and the inlet of the first stage 24 of the engine turbine. Communicating with the probe 38 is a conduit 42 which conducts fluid at compressor outlet pressure to the sensing device 10. It will be understood that the fluid pressure sampling probes 34 and 38 are disposed to receive pressure fluid at the outlet and inlet, respectively, of the turbine, in order to measure or sense the pressure ratio from the inlet to the outlet thereof.

A thermostat 44 is provided with a temperature sensing probe 46 disposed in the compressor inlet plenum 14 to sense the temperature of air entering the first stage 16 of the jet engine compressor. Connected with the thermostat 44, and operable in accordance with its responses to changes in temperature, is a temperature pressure transducer 48, which receives pressure fluid through a conduit 50 and exhausts pressure fluid through a conduit 52. The transducer is provided with a controlled fluid pressure conduit 54 in which the pressure of the fluid is varied by the transducer 48 in response to the operation of the thermostat 44 as affected by temperature variations in fluid entering the engine compressor.

The transducer 48 is a conventional temperature pressure transducer which varies fluid pressure in accordance with temperature changes, and this transducer 48 utilizes engine fuel fluid which is normally maintained under pressure by a conventional constant displacement fuel pump 49 driven by the engine 12. The advantage in using this hydraulic fluid is that it is maintained at a high pressure level regardless of engine speed. Therefore, this fluid is capable of operating small, compact hydraulic devices during operation of the engine under low speed conditions.

Figure 2:
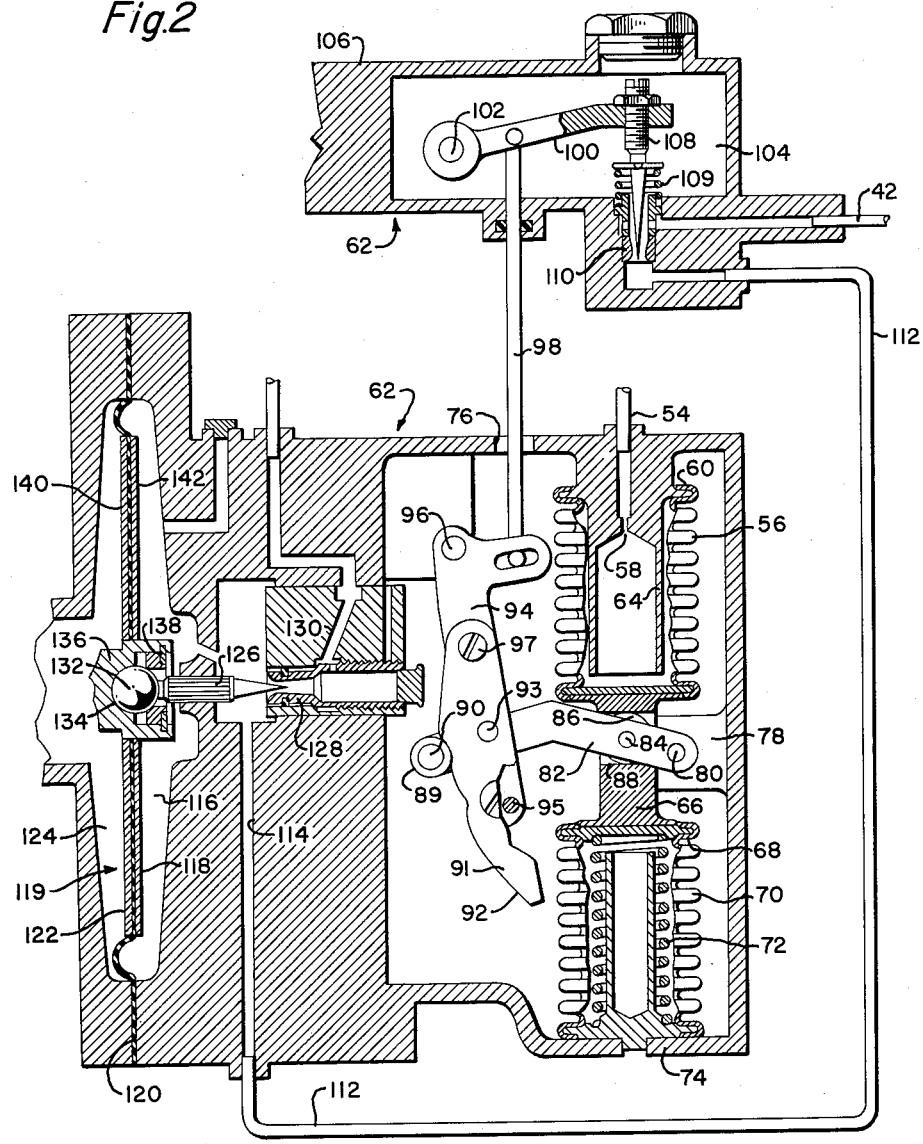
FIG. 2 is a diagrammatic sectional view of the temperature compensated pressure ratio sensing device and servomechanism forming a part of the system shown in FIG. 1.

The conduit 54, which delivers control fluid pressure to the sensing device 10, communicates, as shown in FIG. 2, with the interior of a bellows 56 via a restricted passage 58. The bellows 56 is fixed at one end 60 to the interior of the housing 62 of the sensing device 10 by a cylindrical projection 64, which is integral with the housing 62 and forms a guide within the convolutions of the bellows 56. The opposite end of the bellows 56 is connected to a rigid coupling member 66, which is in turn connected to one end 68 of another bellows 70. This bellows 70 is evacuated and internally loaded by a compression spring 72, which normally tends to extend the bellows 70 and to compress the bellows 56. The bellows 70 and spring 72 are rigidly supported by one side 74 of the housing 62. The bellows 56 and 70 are both surrounded by ambient atmosphere admitted to the housing 62 through an opening 76.

Since the bellows 56 and 70 are opposed to each other and interconnected by the coupling member 66, the effects of atmospheric or ambient pressure changes and the resiliency of the bellows impose equal and opposite forces thereon. Since the bellows 70 is evacuated, there is no fluid internally thereof which responds thermally and expands or contracts. Thus, ambient pressure and temperature changes do not adversely affect the assembly of the bellows 56 and 70, so that the bellows respond only to absolute fluid pressure internally of the bellows 56 acting relative to the force of the spring 72. The assembly of the bellows 56 and 70 is thus capable of responding in direct proportion to variations in fluid pressure internally of the bellows 56, which pressure is controlled in proportion to air temperature variations by means of the temperature pressure transducer 48 hereinbefore described.

Adjacent to the coupling member 66, the housing 62 is provided with an internally projecting boss 78 supporting a pin 80 on which a lever 82 is pivotally mounted at one end. Carried by the lever 82 is a pin 84, which supports a roller 86 disposed in a track 88 extending transversely of the coupling member 66, whereby axial movement of the bellows 56 and 70 transfers pivotal motion to the lever 82.

A cam follower 89 is mounted on a pin 90 carried by the free end of the lever 82, and this roller engages a cam 91 having a contoured surface 92. The cam 91 is adjustably mounted on a lever 94, which is pivotally mounted in the housing 62 on a pin 96. The cam 91 is pivotally mounted on a pin 93 carried by the lever 94. An eccentric pin 95 operates to pivotally adjust the cam about the axis of the pin 93. A set screw 97 is threadedly engaged with the lever 94 and is disposed to clamp the cam 91 in fixed connection therewith to hold it in adjusted positions. Adjustment of the cam 91 relative to the lever 94 is provided for convenience in calibrating the sensing device of the present invention.

Pivotally connected at one end to the lever 94 is a link 98, which extends through the opening 76 in the housing. This link 98, at its opposite end, is pivotally connected with a lever 100, and this lever is pivotally mounted on a pin 102 located within a closed chamber 104 carried by a portion 106 of the housing 62.

A needle valve 108 is carried and operable by the lever 100. A spring 109 is disposed to urge the needle valve 108 toward an open position relative to a sonic nozzle 110 in the control of fluid flow from the conduit 42 into a conduit 112, which latter conduit communicates via a passage 114 with a chamber 116 at one side 118 of a movable wall means 119 having a diaphragm 120, which may be made of any suitable material.

The side 122 of the diaphragm opposite that exposed to chamber 116 is exposed to a second chamber 124 in the housing 62, such chamber receiving turbine outlet fluid pressure through the conduit 36. A second needle valve 126 is connected for movement with the movable wall means 119 to modulate fluid pressure in chamber 116 received through the conduit 112. The valve 126 cooperates with a second sonic nozzle 128, from which a vent passage 130 extends to ambient atmosphere. The stem of needle valve 126 is provided with a spherical portion 132, which is disposed in a conforming socket 134 formed in one end portion of a shaft 136. A snap ring 138 retains the valve in place in the shaft.

The shaft 136 is disposed concentrically of the diaphragm 120 and connected to clamp plates 140 and 142, which are secured to opposite sides of such diaphragm. The shaft 136 is provided, at the end opposite the diaphragm, with a bore 144 containing a spring 146, which urges a concave bearing member 148 into engagement with a spherical bearing member 150. Opposed to the bearing member 148 is an adjustable bearing member 152, which is threadedly secured in the end of the shaft 136. The shaft 136 has an opening at one side through which a stem 154 on ball element 150 extends. This stem is threadedly connected to a yoke 156 fixed to the end of a lever 158.

To pivotally support the lever, the yoke 156 is provided with laterally extending trunnions 160 and 162, which are supported in bearings 164 and 166, respectively, mounted in side wall portions 168 and 170 of the housing 62. As shown in FIG. 3 of the drawings, trunnions 160 and 162 are disposed on a common axis, which extends transversely of the housing 62. This arrangement permits the bearing member 150 and lever 158 to be pivoted about an axis provided by the trunnions 160 and 162 when the diaphragm 120 is moved.

Lever 158 extends from one portion of housing 62, which receives air or other gases under pressure, into another portion having a chamber 172, which receives liquid, such as oil or other fuel, to be returned through passage 173 to a reservoir 174. Mixing of these fluids is prevented by a bellows 175, which is hermetically sealed at one end to the casing, as at 176, and at the opposite end to the yoke 156, as at 178. This bellows permits rocking movement of the lever, yet the mixing of the gases and liquids is prevented. A shield 180, having a close fit with the lever 158 adjacent the fulcrum thereof, is provided to furnish a restriction in case of failure of the bellows.

The upper portion of the housing 62 supports a servomechanism 182 which is operated in response to rocking movement of the lever 158 caused by movement of the diaphragm 120.

The lever 158 is provided with a spherical end portion 188, which engages opposed pilot valve elements 190 and 191 of a servomechanism 182. The pilot valve elements 190 and 191 are slidably mounted in the bore 194 of a sleeve element 196, which is fixed in a second sleeve to provide the main servo valve element 200, this element being reciprocally mounted in a bore 202 in the housing 62. Pressure fluid is supplied to an annular groove 204, disposed adjacent one end of the bore 202, via passages 206 and 208, filter 210, and inlet conduit 212.

This inlet conduit 212 receives fluid under pressure from the delivery conduit 50 of the liquid fuel pump 49, as shown in FIG. 1 of the drawings. The passage 208 is provided with a branch passage 216, which communicates with a second annular groove 218 disposed adjacent the other end of the bore 202. The grooves 204 and 218 communicate with passages 220 and 222, respectively, extending longitudinally of the sleeve element 196. These passages 220 and 222 communicate with the hollow interior of the element 196 at the outer ends of pilot valves 191 and 190, respectively. The fluid under pressure supplied through the passages 220 and 222 urges the pilot valves into engagement with the spherical end portion of lever 158. Annular grooves 224 and 226 in the element 196 are arranged to be placed in communication with the passages 220 and 222, respectively, when the respective pilot valves 191 and 190 are moved in one direction or the other by lever 158. Communicating with the annular grooves 224 and 226 are passages 228 and 230, which extend to and communicate with spaces 232 and 234 in the housing 62 at the opposite ends of the sleeve element 196. These spaces communicate with each other through a transfer passage 236 having a restriction 238 therein which is provided to damp the action of fluid passing from one of the spaces 232 and 234 to the other.

The pilot valve elements 190 and 191 are provided with cylindrical portions 193 and 195, respectively, which are substantially equal in length to the width of the annular grooves 224 and 226, respectively. The elements 190 and 191 are also provided with annular grooves 240 and 242, respectively, which, in the neutral position of the valve, register with openings 244 and 246 in the side wall of the hollow cylindrical valve element 196. These openings 244 and 246 communicate with the fluid return chamber 172, which, as previously described, communicates with reservoir 174 through passage 173.

The bore 202 is provided with an annular groove 252 with which a conduit 254 communicates. As shown in FIG. 1, conduit 254 conducts signal pressure to an afterburner fuel control device 256, which controls the amount of fuel delivered to the fuel nozzle 30. This control 256 receives fuel under pressure through a conduit 258 communicating with the conduit 50 leading from the pump 49. Control 256 forms no part of the present invention. When a fluid pressure signal is directed through the conduit 254, a predetermined operation of the fuel control 256 will be effected.

From FIG. 2, it will be seen that a groove 260 is formed in the outer surface of the servo valve element 200 adjacent the groove 252. In the neutral or inoperative condition of the apparatus, groove 260 registers with groove 252 and the flow of fluid pressure to or from passage 254 is prevented. If, however, main valve element is moved sufficiently to either side of the neutral position, in which it is shown, groove 260 will establish communication between passage 254 and the pressure pump 49 or the reservoir 174. In the former instance a pressure signal will be fed to passage 254; in the latter instance the pressure signal in passage 254 will be relieved. Pressure signals imparted through passage 254 to the member 256 control the admission of fuel to the afterburner.

The main servo valve element 200 is also provided with another external groove 266, which registers in the normal position of the valve with a groove 268 in the housing 62. The groove 268 is hydraulically connected, by a conduit 270, with an afterburner ignition control device 272, as indicated in FIG. 1 of the drawings.

The grooves 266 and 268 are arranged so that fluid pressure signals will be provided in the conduit 270 to turn the ignition system on and off in coordinated relation with the operation of the afterburner fuel control 256, all of which is no part of the present invention.

The servo valve element 200 is provided with a recess 274 in which the spherical end 276 of a lever 278 is engaged. The lever 278 is pivoted on a pin 280, and is provided with an actuating arm 282 having a screw 284 adjustably connected therewith. The screw 284 is engageable with a valve plunger 286, which is provided with a spherical poppet valve element 288.

This poppet valve element is engageable with a seat 290 communicating with an ambient vent conduit 292 and a chamber 294 in the housing 62. A conduit 296 communicates with the chamber 294 and a surge relief valve mechanism 298, which is located to relieve pressure downstream of the first stage 16 of the compressor, as shown in FIG. 1 of the drawings.

The surge relief valve mechanism 298 forms no part of the present invention.

The temperature compensated pressure ratio sensing device of the present invention operates substantially as follows: As hereinbefore pointed out, the pressures existing at the inlet and the outlet of the turbine 22 are sensed by means of pressure sampling probes 38 and 34, respectively. To achieve the objects of the invention, the difference between these pressures must, of necessity, be compensated in accordance with temperature of air at the inlet of the turbine compressor. The thermostat 46 is utilized for this purpose, so that any changes in temperature of the air entering the compressor may be taken into account with respect to a given ratio of pressure difference existing between the inlet and the outlet of the turbine.

When the engine 12 is operating at substantially constant speed and the compression ratio from the inlet to the outlet of the turbine is at given value, any decrease of temperature at the inlet to the engine compressor causes an increase in air density, and a consequent increase in the pressure ratio across the turbine. This increase in pressure ratio is sensed by the probes 38 and 34 and transmitted to the diaphragm 120.

The thermostat 46, in response to a reduction of temperature, causes the temperature pressure transducer 48 to transmit a reduced fluid pressure signal in the conduit 54, which communicates through the orifice 58 with the interior of the bellows 56. As pressure within the bellows 56 is reduced, force of the spring 72 in the bellows 70 causes movement of the coupling member 66 and roller 86 toward the bellows 56. Such action moves the cam follower 89 relative to the cam 92, thereby pivoting the lever 94 about the axis of the pin 96, causing the link 98 to pivot the lever 100 about the axis of the pin 102 in a direction to move the valve element 108 and increase the effective size of the nozzle 110. This action permits a slight increase in flow of pressure fluid from the pressure sampling probe 38 via the tube 42 and into the tube 112, which communicates with the chamber 116 via the passage 114.

Thus, a reduction of temperature sensed at the inlet of the engine compressor results in an increase of fluid pressure in the chamber 116 at one side of the diaphragm 120. It will be understood that the foregoing action varies the ratio between turbine inlet and outlet pressures normally sensed by the diaphragm 120 to compensate for the increase in weight flow of fluid through the turbine occasioned by a reduction of air temperature at the inlet of the compressor. The compensation for temperature variation is in addition to the increase in pressure ratio normally resulting from a reduction in air temperature.

As hereinbefore described, fluid pressure at the outlet of the turbine is conducted via the conduit 36 into the chamber 124 at the opposite side of the diaphragm 120 from the chamber 116.

The needle valve element 126 carried by the diaphragm 120 operates relative to the nozzle 128 to bleed off pressure from the chamber 116 to atmosphere via the passage 130. Each change of pressure differential across the diaphragm 120 causes movement of the valve 126, which varies pressure in the chamber 116. It will be seen that the valve element 126 provides a feedback function, which tends to stabilize operation or response of the diaphragm 120 relative to changes of pressure differential thereacross. For example, when the valve element 109 permits an increased flow of pressure fluid through the tube 112 and into communication with the chamber 116, the diaphragm carries the valve element 126 toward an open position, tending to reduce pressure in the chamber 116 and thereby anticipate an overshoot of pressure which might otherwise occur in the chamber 116.

When the thermostat 46 senses an increase of temperature at the inlet to the engine compressor, the opposite effects take place, whereby the transducer 48 increases fluid pressure in the conduit 54 and causes pressure to increase in the bellows 56, thereby actuating the cam follower 89 with respect to the cam 92, which results in pivotal movement of the lever 94 about its pivot pin 96. This action causes the link 98 to pivot the lever 100 in a direction to carry the valve element 108 toward a closed position with respect to the orifice 110, thereby reducing fluid flow from the pressure sampling probe 38 via conduits 42 and 112 to the chamber 116.

When fluid pressure is thus reduced in the chamber 116, the diaphragm 120 tends to move the needle valve element 126 toward a closed position relative to the nozzle orifice 128, and such action also carries the shaft 136 in the same direction, thereby pivoting the lever 158 about the axes of the trunnions 160 and 162. Such pivotal movement of the lever 158 causes the upper end 188 thereof to move in a direction indicated by an arrow A. An increase of turbine pressure ratio sensed by the diaphragm 120 causes movement of said upper end 188 in a direction indicated by an arrow B. Extreme movement of the lever 158 in the direction of the arrow B may, for example, be in response to conditions involving a decreased temperature at the inlet of the compressor and a compression ratio across the turbine which exceeds predetermined pressure ratio and temperature conditions.

Extreme movement of the lever 158 in the opposite direction, as indicated by the arrow A, causes interruption of fuel supplied to the nozzle 30 in accordance with nominal conditions of compressor inlet temperature and compression ratio across the turbine amounting to a predetermined reduction of such conditions. The upper end 188 of the lever 158 operates oppositely acting servo pilot valve elements 190 and 191, which cause actuation of the main servo valve element 200, as hereinbefore described, in order to provide a fluid pressure signal in the conduit 254 and to create signals corresponding to either an excessive or a nominal set of conditions involving compressor inlet temperature and turbine pressure ratio.

It should be obvious that any desired signals corresponding to certain variations from a predetermined pressure ratio may be transmitted to any selected location merely by providing suitable means in place of, or in addition to, the servo valve mechanism 192. For example, switch means 300 and 301 have been mounted in portion 106 of housing 62 and cam means 302 are arranged for actuation by a lever arm 303 in response to movement of the servo valve spool. As previously explained, the latter is moved to different positions corresponding with positions assumed by the diaphragm 120 when the pressure ratio across the jet engine turbine changes and the temperature responsive compensations are effected.

An important feature of the present invention is the provision of a control element, the diaphragm 120 in the present illustration, which occupies a certain position when a predetermined pressure ratio across the turbine of the jet engine exists, and assumes other positions, at either side of said certain position, in response to changes in inlet or outlet pressures which produce different pressure ratios, the latter positions of the element being determined in part by temperature responsive means in accordance with atmospheric change. To secure the above features, the diaphragm is exposed on opposite sides to pressure fluids from the turbine inlet and outlet, pressure at one side of the diaphragm being modified, to balance that at the other side, by a diaphragm-controlled means, a nozzle 128 in the form of the invention illustrated, and cooperative means, another nozzle 110, adjusted in response to variations in engine compressor inlet temperatures. In the event either turbine inlet or outlet pressures change from the selected ratio, the diaphragm will move and adjust the first means, nozzle 128, to modify the pressure at one side of the diaphragm to equalize pressures on the diaphragm and retain it in its new position. The new position may be partially determined by the temperature responsive means through the adjustment of a second means, nozzle 110, which assists the first means in modifying the pressure applied to one side of the diaphragm.

It will be obvious from the preceding description that the action of the servo valve mechanism 106, and/or any other desired actuating or signal transmitting means may reflect the positions or movements of the diaphram or ratio sensing element 120 to produce desired operations of the engine.

It will be obvious to those skilled in the art that various modifications of the present invention may be resorted to without departing from the spirit and scope thereof.

We claim:

1. A gas turbine engine afterburner control system having an afterburner fuel control, comprising: a movable wall means; means for transmitting a signal to the fuel control, said transmitting means being operatively connected with said movable wall means; a first passage means for applying fluid at turbine outlet pressure to one side of said movable wall means; a second passage means conducting fluid from the turbine inlet to a region of lower pressure; means forming orifices in series in said second passage means, fluid at the pressure existing between said orifices being applied to the other side of said movable wall, differences in pressures applied to opposite sides of said movable wall effecting movement thereof and actuation of said signal transmitting mechanism; a first means operatively connected with said movable wall for varying the effective size of one of said orifices in response to movement of said wall; a needle valve extending into another of said orifices, said needle valve being mounted on a pivoted arm to swing into and out of the orifice to vary the effective size thereof, a pair of bellows mounted in axial alignment and having their remote ends secured to a rigid support, one of said bellows being evacuated and the interior of the other of said bellows being exposed to a pressure corresponding to the temperature of the compression intake air, said bellows being exposed to ambient air to render the same insensitive to changes in altitude, a coupling member secured between the proximate ends of the bellows, a transverse channel in the coupling member, a bracket adjacent to the coupling member, a lever mounted on the bracket and in sliding engagement with the channel, a cam pivotally mounted adjacent to the lever, follower means mounted on the lever in position to engage the cam, a link connecting the arm and the cam for swinging the arm when the cam is pivoted by the level and follower, whereby the relative pressures in the bellows control the relative pressure applied to the movable wall.

2. A gas turbine engine afterburner control system having an afterburner fuel control, comprising: a movable wall means; means transmitting a signal to the fuel control, said transmitting means being operatively connected with said movable wall means; a first passage means for applying fluid at turbine outlet pressure to one side of said movable wall means; a second passage means conducting fluid from the turbine inlet to a region of lower pressure; means forming orifices in series in said second passage means, fluid at the pressure existing between said orifices being applied to the other side of said movable wall, differences in pressures applied to opposite sides of said movable wall effecting movement thereof and actuation of said signal transmitting mechanism; a first means operatively connected with said movable wall for varying the effective size of one of said orifices in response to movement of said wall; a needle valve extending into another of said orifices, said needle valve being mounted on a pivoted arm to swing into and out or the orifice to vary the effective size thereof, a pair of bellows mounted in axial alignment and having their remote ends secured to a rigid support, one of said bellows being evacuated and the interior of the other of said bellows being exposed to a pressure corresponding to the temperature of the compression intake air, said bellows being exposed to ambient air to render the same insensitive to changes in altitude, a coupling member secured between the proximate ends of the bellows, a transverse channel in the coupling member, a bracket adjacent to the coupling member, a lever mounted on the bracket and in sliding engagement with the channel, a cam pivotally mounted adjacent to the lever, said cam including a mounting plate and a cam plate, means for pivoting the cam plate relative to the mounting plate, means mounted on the lever in position to engage the cam, a link connecting the arm and the cam for swinging the arm when the cam is pivoted by the lever, whereby the relative pressures in the bellows control the relative pressure acting on the movable wall.

3. A gas turbine engine afterburner control system having an afterburner fuel control comprising: means forming fluid pressure receiving chambers separated by a movable wall having first and second opposed surfaces; a first passage means for applying fluid pressure from a first source to the first surface of said movable wall; a second passage means for conducting fluid pressure from a second source to a region of lower pressure; means forming orifices in series in said second passage means, fluid at the pressure existing between said orifices being applied to the second surface of said movable wall; a first valve means movably supported adjacent one of said orifices to vary the effective size thereof and change the fluid pressure between said orifices to effect movement of said wall; a second valve means operatively connected with said movable wall for varying the effective size of another of said orifices in response to movement of said wall; pressure responsive means operatively connected with said first valve to effect movement thereof; a pilot valve sleeve; a pair of valve plungers mounted in the sleeve intermediate the ends thereof, the adjacent ends of said plungers being spaced apart; a valve spool enclosing the sleeve and mounted within a cylindrical valve body; conduits for supplying fluid under pressure to the valve spool; conduits in the valve spool for conveying fluid to the valve plungers; a rod secured to the first surface of the movable wall; a lever having one end interposed between and in engagement with the valve plungers and the opposite end pivotally secured to the rod, means for fulcruming the lever adjacent to the rod and means forming a fluid seal between the valve body and the lever whereby displacement of the movable wall is transmitted by the lever to the plungers to operate the pilot valve and the valve spool to transmit a signal to the afterburner fuel control in proportion to the displacement of the movable wall.

4. A gas turbine engine afterburner control system having an afterburner fuel control comprising: means forming fluid pressure receiving chambers separated by a movable wall having first and second opposed surfaces; a first passage means for applying fluid pressure from a first source to the first surface of said movable wall; a second passage means for conducting fluid pressure from a second source to a region of lower pressure; means forming orifices in series in said second passage means, fluid at the pressure existing between said orifices being applied to the second surface of said movable wall; a first valve means movably supported adjacent one of said orifices to vary the effective size thereof and change the fluid pressure between said orifices to effect movement of said wall; a second valve means operatively connected with said movable wall for varying the effective size of another of said orifices in response to movement of said wall; pressure responsive means operatively connected with said first valve to effect movement thereof; a pilot valve sleeve; a pair of valve plungers mounted in the sleeve intermediate the ends thereof, the adjacent ends of said plungers being spaced apart; a valve spool enclosing the sleeve and mounted within a cylindrical valve body; means for supplying afterburner fuel to the valve spool, means for conducting a fuel signal from the valve spool to the afterburner fuel control, conduits in the valve spool for conveying fluid to the valve plungers and means forming a connection between the first surface of the movable wall and the pair of plungers whereby displacement of the movable wall controls the flow of fuel to the afterburner.

References Cited in the file of this patent

UNITED STATES PATENTS

| | | |
|---|---|---|
| 2,435,902 | Reggio | Feb. 10, 1948 |
| 2,622,393 | Edwards et al. | Dec. 23, 1952 |
| 2,652,813 | Reuter | Sept. 22, 1953 |
| 2,667,743 | Lee | Feb. 2, 1954 |
| 2,736,166 | Mock | Feb. 28, 1956 |
| 2,759,549 | Best | Aug. 21, 1956 |
| 2,981,058 | Reed | Apr. 25, 1961 |

OTHER REFERENCES

Publication: "A New Approach to Turbojet and Ramjet Engine Control," by Wendell E. Reed, pages 472–485, SAE Transactions 1956, vol. 64, Oct. 14, 1955.

Publication: "Requirements, Parameters, and Design Considerations for Pneumatic Inlet Control Systems," by R. E. Martzdorff and C. F. Newberry, pages 496–514, SAE Transactions 1958, vol. 66, 1958.

Publication: "Pneumatic Jet Nozzle Control," by J. M. Stephenson, pages 44–45, Aircraft Engineering, February 1958, vol. 30, No. 348.